(12) United States Patent
Yagi et al.

(10) Patent No.: US 6,507,406 B1
(45) Date of Patent: Jan. 14, 2003

(54) THREE-DIMENSIONAL DATA INPUT APPARATUS

(75) Inventors: Fumiya Yagi, Toyonaka (JP); Eiichi Ide, Itami (JP); Hiroshi Uchino, Kyoto (JP); Koichi Kamon, Takatsuki (JP); Takashi Kondo, Sakai (JP)

(73) Assignee: Minolta Co., Ltd., Osaka (JP)

( * ) Notice: Subject to any disclaimer, the term of this patent is extended or adjusted under 35 U.S.C. 154(b) by 246 days.

(21) Appl. No.: 09/589,516

(22) Filed: Jun. 8, 2000

(30) Foreign Application Priority Data

Jun. 9, 1999 (JP) .......................................... 11-161811

(51) Int. Cl.⁷ .............................................. G01B 11/24

(52) U.S. Cl. ...................................... 356/602; 702/152

(58) Field of Search ................................ 356/601, 602, 356/603, 607, 608, 614, 623; 702/22, 150, 152, 159; 250/559.22, 559.23

(56) References Cited

U.S. PATENT DOCUMENTS 5,818,959 A * 10/1998 Webb et al. ................ 382/154
6,268,918 B1 * 7/2001 Tanabe et al. .............. 356/376

FOREIGN PATENT DOCUMENTS

JP          10-132562          5/1998

* cited by examiner

*Primary Examiner*—Hoa Q. Pham
(74) *Attorney, Agent, or Firm*—McDermott, Will & Emery (57) ABSTRACT

An object is to provide a three-dimensional data input apparatus that enables data currently required by the user to be easily extracted from the stored past three-dimensional data, shooting position data or shooting direction data. When the user provides the three-dimensional measuring device 1 with a measurement instruction, the portions operate through control by the central processing portion 17 to obtain the three-dimensional data SS and the two-dimensional image data SN of the object Q. The group of the three-dimensional data SS, the two-dimensional image data SN, the position data SP and the attitude data SA that are in the one-to-one correspondence with one another as described above are stored in the storage portion 18 every time the three-dimensional data of the object Q is measured. In a case where a fixed point observation of the object is repetitively performed by use of the three-dimensional measuring device 1, by extracting from the storage portion 18 three-dimensional data SSK and two-dimensional image data SNK obtained in the past and comparing them with the present three-dimensional data SSG and two-dimensional image data SNG, the change in the configuration of the object during that period can be found.

15 Claims, 5 Drawing Sheets

THREE-DIMENSIONAL DATA INPUT APPARATUS

This application is based on application No. 11-161811 filed in Japan, the content of which is hereby incorporated by reference.

BACKGROUND OF THE INVENTION

1. Field of the Invention

The present invention relates to a three-dimensional data input apparatus for inputting three-dimensional data by measuring an object to be measured.

2. Description of the Related Art

As apparatuses for inputting three-dimensional data of an object without making contact therewith, three-dimensional data input apparatuses employing a light section method, an optical time-of-flight method and a stereo method have conventionally been known.

By repeating a fixed point observation as described below by use of a three-dimensional data input apparatus as mentioned above, changes in configuration and external appearance of an object whose configuration and external appearance change with time, such as a plant in a flowerpot or a building under construction, can be captured.

That is, the object is measured by use of a three-dimensional data input apparatus, thereby obtaining first three-dimensional data. After a lapse of a predetermined time or period, the same object is measured from the same position, thereby obtaining second three-dimensional data. By comparing the first and the second three-dimensional data, the amount of change with time is obtained. Thereafter, three-dimensional data is obtained a plurality of times in a similar manner, and by comparing the three-dimensional data obtained at the times, the amount or the manner of change with time is obtained.

When the object is one that can be moved or tilted like a plant in a flowerpot, the relative position relationship between the object and the three-dimensional input apparatus can be easily changed. Therefore, it is unnecessary to take the three-dimensional input apparatus out to the place where the object is situated, but by bringing the object in the room where the three-dimensional input apparatus is placed, measurement can be made under excellent conditions.

When the object is a building or a landform, however, the object cannot be moved. Therefore, it is necessary to place the three-dimensional input apparatus in the same position as the position where the last measurement was performed and measure the object from the position in the same direction as that in which the last measurement was performed.

As an apparatus for inputting three-dimensional data of an object such as a building or a landform, an apparatus described in Japanese Laid-open Patent Application H10-132562 has been proposed.

This apparatus measures the distances to target points of the object by the stereo method, and is provided with measuring devices such as a GPS (global positioning system) receiver, a magnetic sensor and a gyrocompass. Based on the measurement position of the apparatus detected by the GPS receiver, the azimuth data of the target points detected by the magnetic sensor and the inclination data detected by the gyrocompass, the distances to the target points and the altitudes of the target points are calculated on the principle of triangulation. The measurement data detected by the measuring devices and the calculated three-dimensional data such as the distances and the altitudes are recorded in a recorder, or displayed on a display together with a two-dimensional image of the object in response to an operation by the user.

To perform a fixed point observation by use of the three-dimensional data input apparatus as described above, it is necessary to perform a comparison between the present and past data with respect to the three-dimensional data, the measurement position data and the measurement direction data obtained through the measurements.

However, in the apparatus described in the above-mentioned patent application, since the data are merely displayed on a display, it is not easy to compare them. That is, for example, it is not easy to extract the three-dimensional data obtained through a measurement performed under the same condition as the present measurement, from a multiplicity of data measured and recorded in the past. Moreover, it is not easy to extract the measurement position data and the measurement direction data obtained when the measurement was performed under a similar condition to the present measurement, from a multiplicity of data measured and recorded in the past.

SUMMARY OF THE INVENTION

The present invention is made in view of the above-mentioned problems, and an object thereof is to provide a three-dimensional data input apparatus that enables data currently required by the user to be easily extracted from the stored past three-dimensional data, measurement position data or measurement direction data.

Moreover, to perform a fixed point observation, it is necessary to perform a measurement from the same position as the past measurement position. Accordingly, another object of the present invention to provide a three-dimensional data input apparatus that enables the measuring device to be easily placed in the same position as the past placement position.

To achieve the above-mentioned objects, a three-dimensional data input apparatus for measuring three-dimensional data of an object to be measured according to the present invention, comprises: a data input device for obtaining a measurement position data representing a measurement position at measurement; a storage device for storing therein the measured three-dimensional data so as to be associated with the measurement position data; and extraction means for extracting past measurement position data corresponding to a present measurement position by comparing present measurement position data with a plurality of past measurement position data.

Another three-dimensional data input apparatus according to the present invention is a three-dimensional data input apparatus for measuring three-dimensional data of an object to be measured, comprises: a measurement position data input device for obtaining a measurement position data representing a measurement position at time of measurement; a storage device for storing therein the measured three-dimensional data so as to be associated with the measurement position data; and a display device for displaying a difference between a present measurement position and a stored measurement position in a past measurement.

Yet another three-dimensional data input apparatus according to the present invention is a three-dimensional data input apparatus having measurement device for inputting three-dimensional data by measuring an object to be measured, comprises: a measurement position input device for obtaining a measurement position data of the measurement device at the time of a measurement; a measurement direction input device for obtaining a measurement direction data of the measurement device at the time of the measurement; a two-dimensional image input device for inputting two-dimensional image data of the object to be measured; storage device for storing therein the measurement position data, the measurement direction data and the two-dimensional image data so as to be associated with one another; extraction means for extracting from the storage device past measurement position data corresponding to present measurement position data or past measurement direction data corresponding to present measurement direction data; and a display device for displaying a past measurement position and a past measurement direction based on the extracted past measurement position data or past measurement direction data.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

In this specification, when it is necessary to distinguish between present data and past data with respect to three-dimensional data SS, two-dimensional image data SN, position data SP and attitude data SA, "K" representing "past" or "G" representing "present" is affixed to the ends of the reference designations of these data. The word "shooting" will be sometimes used for the word "measurement".

Figure 1:
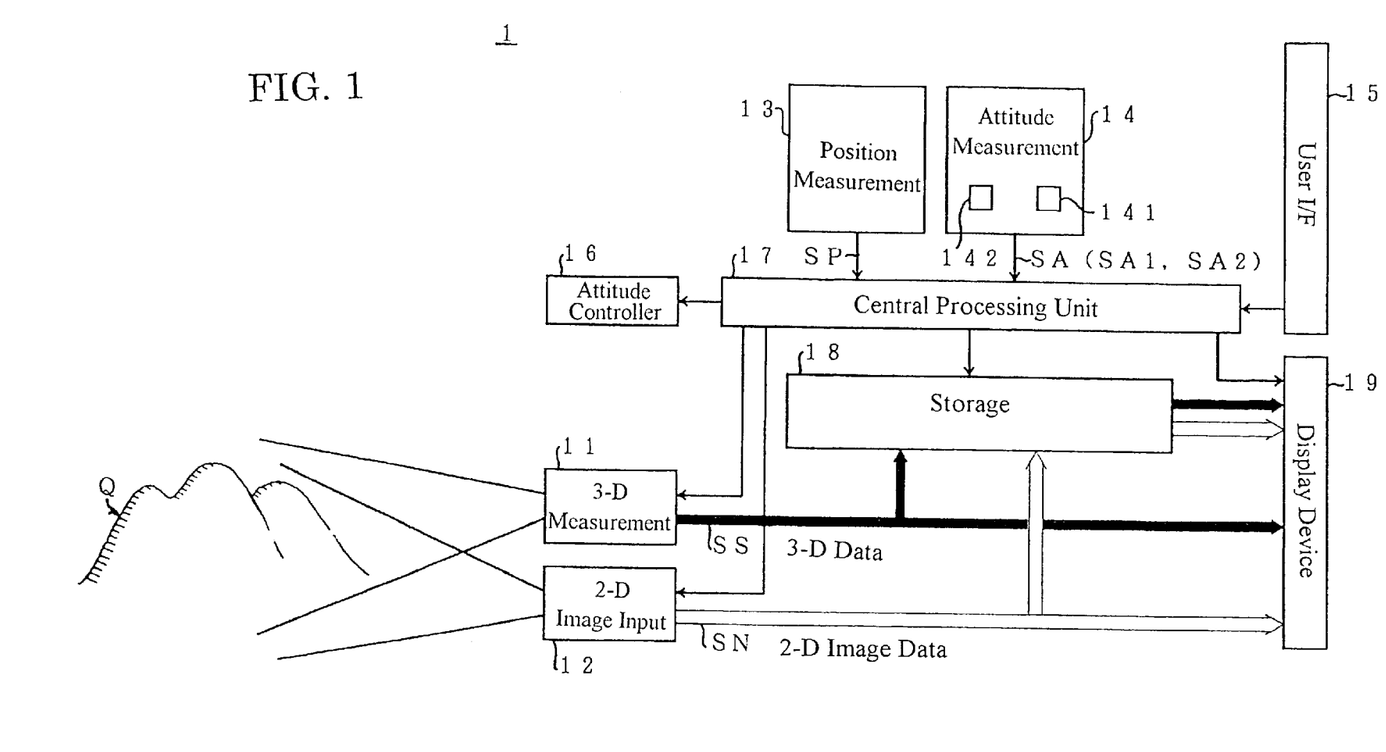
FIG. 1 is a block diagram functionally showing a three-dimensional measuring device according to an embodiment of the present invention.

FIG. 1 is a block diagram functionally showing a three-dimensional measuring device 1 according to an embodiment of the present invention.

As shown in FIG. 1, the three-dimensional measuring device 1 comprises a three-dimensional measurement portion 11, a two-dimensional image input portion 12, a position measurement portion 13, an attitude measurement portion 14, a user interface 15, an attitude control portion 16, a central processing portion 17, a storage portion 18 and a display portion 19. These portions are incorporated in a non-illustrated casing and configured as one independent device.

The three-dimensional measurement portion 11 measures three-dimensional data SS of the object without making contact therewith. That is, the three-dimensional measurement portion 11 obtains three-dimensional data SS of the object Q in response to an instruction provided by the user through the user interface 15, and sends the obtained data SS to the storage portion 18 and the display portion 19. As the non-contact three-dimensional measurement method, for example, the light section method, the optical time-of-flight method or the stereo method is applied.

According to the light section method, slit light is projected onto the object Q, and the slit light is moved in a direction vertical to the slit light plane to scan the object Q. At a visual point a predetermined distance away from the object Q, reflected light of the slit light on the object Q is observed as a projected image. Based on the projected image, the three-dimensional data of the object Q is calculated by use of the principle of the triangulation.

According to the optical time-of-fight method, spot light is transmitted toward the object Q, and light reflected at the object Q is received. By directly measuring the time from the transmission to the reception, or by indirectly measuring the time based on the phase difference or the like, the distance to the object Q is calculated. Then, by repeating the measurement while scanning the object Q with spot light, the distance distribution of a predetermined range is measured, thereby obtaining the three-dimensional data of the object Q.

According to the stereo method, from two two-dimensional images obtained through measurements performed from two visual points being a predetermined distance away from each other, corresponding points of these images are obtained. By doing this, three-dimensional data is calculated.

The two-dimensional image input portion 12 continually captures the two-dimensional image of a portion to be measured of the object Q, and sends the two-dimensional data SN to the storage portion 18 or the display portion 19.

The position measurement portion 13 which is a GPS measures a physical amount corresponding to the placement position of the three-dimensional measuring device 1 at each moment, and outputs the amount as the position data SP. From the placement position of the three-dimensional measuring device 1, the measurement position of the three-dimensional measurement portion 11 is identified. The GPS is a system in which radio waves transmitted from a plurality of artificial satellites orbiting around the Earth are received by a ground receiver and the absolute position (coordinates) on the ground is obtained based on the time required for the radio waves to reach the receiver. The GPS includes single positioning and relative positioning. While the relative positioning includes various methods such as a static method and a kinematic method, any method is applicable as long as a necessary degree of measurement precision is obtained.

The attitude measurement portion 14 comprising an azimuth angle detection portion 141 and an elevation angle detection portion 142 measures a physical amount corresponding to the attitude of the three-dimensional measuring device 1 at each moment, and outputs the amount as the attitude data SA5 Therefore, the attitude data SA comprises azimuth angle data SA1 and elevation angle data SA2. From the attitude of the three-dimensional measuring device 1, the measurement direction of the three-dimensional measurement portion 11 is identified.

The azimuth angle detection portion 141 which is a magnetic sensor or a gyrocompass outputs as the azimuth angle data SA1 a physical amount corresponding to the azimuth angle of the three-dimensional measuring device 1 on the horizontal plane. The magnetic sensor has the function of detecting the magnetism of the earth. The gyrocompass has the function of detecting the angular velocity of its own rotation, and calculates the rotation angle by integrating the detected angular velocity. Therefore, when an absolute azimuth angle (for example, 0 degrees representing the north) is given as the initial value, a physical amount corresponding to the azimuth angle of the three-dimensional measuring device 1 in the horizontal direction can be obtained thereafter. As the gyrocompass, various types are used such as a type in which a small top is rotated inside, a type in which the Coriolis force acting on an internal oscillator is captured based on a change in oscillation mode, and a type in which the Coriolis force is captured based on a change in the phase of light traveling through optical fibers.

The elevation angle detection portion 142 comprising an inclination angle sensor or a gyrocompass measures a physical amount corresponding to the elevation angle or the depression angle of the three-dimensional measuring device 1, and outputs the amount as the elevation angle data SA2. The inclination angle sensor detects the inclination angle of the surface where the three-dimensional measuring device 1 is placed. As the inclination angle sensor, various types are used such as a type in which the inclination of the surface of a liquid filled inside is captured based on a change in electrostatic capacity, a type in which the movement of bubbles in a liquid filled inside is captured based on a change in conductive resistance, and a type in which a change in the acceleration acting on a material point provided inside is captured. When a gyrocompass is used, the rotation angle in the vertical direction is obtained by integrating the angular velocity in the vertical direction detected by the gyrocompass. When an absolute elevation or depression angle (for example, 0 degrees representing the horizontal plane) is given as the initial value, a physical amount corresponding to the elevation angle or the depression angle of the three-dimensional measuring device 1 in the vertical direction can be obtained thereafter.

The attitude measurement portion 14 can be configured by selecting appropriate ones from among the magnetic sensor, the gyrocompass and the inclination sensor, etc. and combining the selected ones.

The user interface 15 which is a keyboard, a mouse or a touch panel accepts an instruction from the user, and sends it to the central processing portion 17.

The attitude control portion 16 controls the overall attitude of the three-dimensional measuring device 1 in response to an instruction from the central processing portion 17. For example, the attitude control portion 16 has a mechanism that rotates in the horizontal direction and a mechanism whose vertical angle can be varied, and these mechanisms are driven in response to an instruction signal from the central processing portion 17. By doing this, the measurement directions of the three-dimensional measurement portion 11 and the two-dimensional image input portion 12 are automatically controlled.

The central processing portion 17 comprises a CPU (central processing unit), a ROM (read only memory), a RAM (random access memory), other peripheral elements and appropriate hardware circuits, and provides the portions with necessary instructions in response to instructions from the user interface 15. Moreover, the central processing portion 17 performs extraction processing which is a feature of this embodiment. The contents of the extraction processing will be described later. As the central processing portion 17, a personal computer externally connected to the three-dimensional measuring device 1 may be used.

The storage portion 18 which is a magnetic disk unit, a floppy disk or an MO (magneto-optical) disk stores therein the three-dimensional data SS, the two-dimensional image data SN, the position data SP and the attitude data SD.

Figure 5:
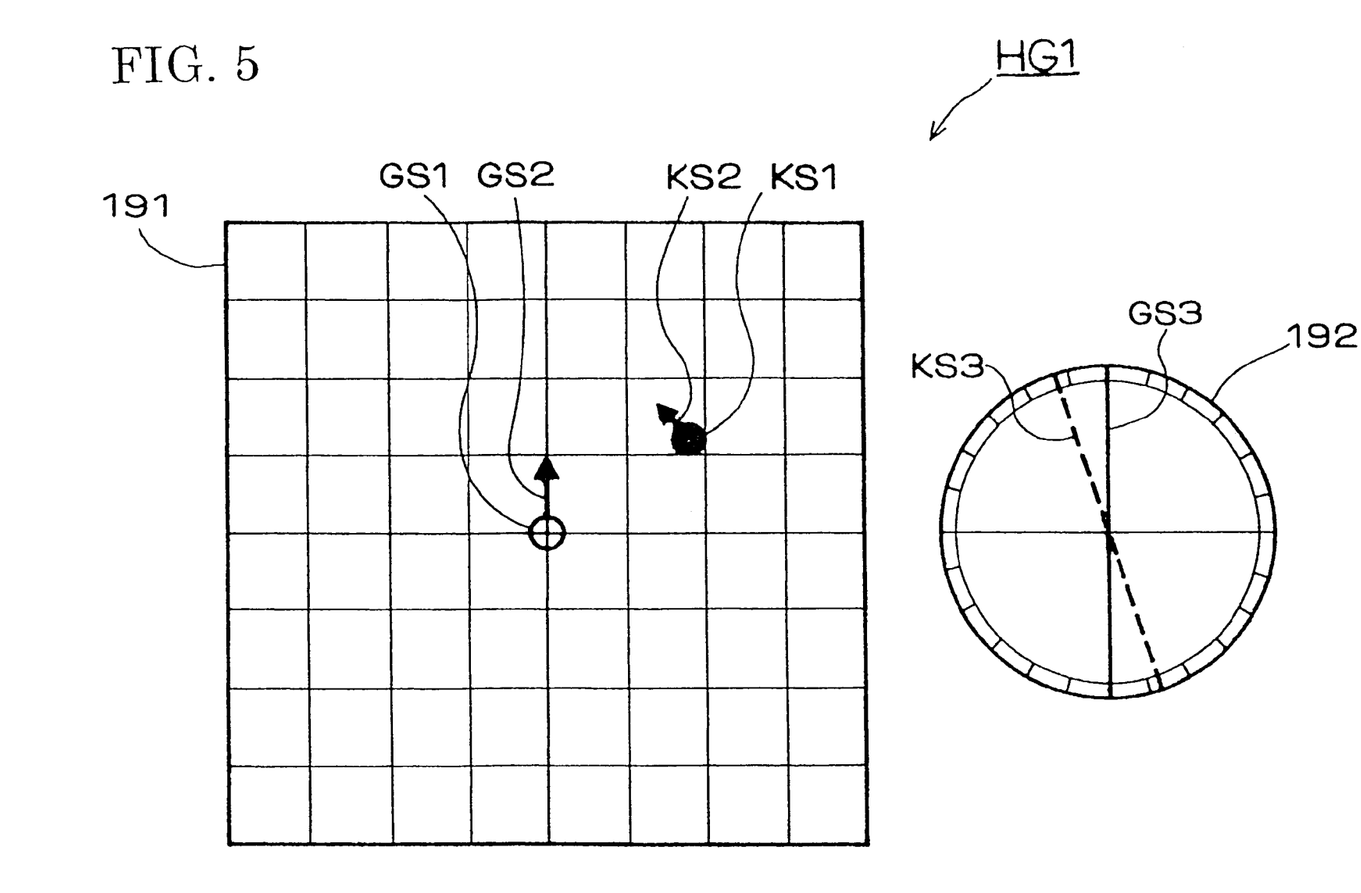
FIG. 5 illustrates an example of a screen showing indices displayed on a display portion.

On the display portion 19, the present or the past ones of the above-mentioned data, that is, the three-dimensional data SS, two-dimensional images, the position data SP and the attitude data SA, and indices GS and KS are displayed in response to an instruction from the user interface 15 (see FIG. 5).

Next, the extraction processing by the three-dimensional measuring device 1 will be described. First, the user places the three-dimensional measuring device 1 in a position from which the object Q is to be measured. Then, the user sets the attitude of the device 1 so that the portion to be measured can be measured.

The position data SP and the attitude data SA output from the position measurement portion 13 and the attitude measurement portion 14, respectively, are calculated by the central processing portion 17. That is, the position data SP is converted into a value corresponding to the longitude and the latitude on the earth. Of the attitude data SA, the azimuth angle data SA1 is converted into a value corresponding to the azimuth angle in the measurement direction. The elevation angle data SA2 is converted into a value corresponding to the elevation angle in the measurement direction. In this specification, the elevation angle can take both positive and negative values. Therefore, when the value of the elevation angle is negative, the elevation angle is the depression angle.

The converted position and attitude data SP and SA (SA1, SA2) are displayed on the display portion 19 as information representative of the present position and attitude of the three-dimensional data input apparatus 1.

When the user provides the three-dimensional measuring device 1 with a measurement instruction, the portions operate through control by the central processing portion 17 to obtain the three-dimensional data SS and the two-dimensional image data SN of the object Q. The two-dimensional image data SN is displayed on the display portion 19 as a two-dimensional image. The user can check the condition of the portion to be measured of the object Q by viewing the displayed two-dimensional image.

The three-dimensional data SS is stored in the storage portion 18 as data of the following format: as data comprising a set of distances between the three-dimensional measuring device 1 and points on the surface of the object Q; as data comprising a set of space coordinates; or data obtained by converting either one of these data into a format generally used in CAD (computer aided design) and computer graphics.

In response to an instruction from the central processing portion 17, the above-described three-dimensional data SS and two-dimensional image data SN are stored in the storage portion 18 so as to be in a one-to-one correspondence with the position data SP and the attitude data SA obtained when the data SS and SN were obtained.

The group of the three-dimensional data SS, the two-dimensional image data SN, the position data SP and the attitude data SA that are in the one-to-one correspondence with one another as described above are stored in the storage portion 18 every time the three-dimensional data of the object Q is measured. By performing a search on the stored data, necessaiy data can be extracted.

In a case where a fixed point observation of the object is repetitively performed by use of the three-dimensional measuring device 1, by extracting from the storage portion 18 three-dimensional data SSK and two-dimensional image data SNK obtained in the past and comparing them with the present three-dimensional data SSG and two-dimensional image data SNG, the change in the configuration of the object during that period can be found. In doing this, it is necessary to extract the past data corresponding the present three-dimensional data SSG and two-dimensional image data SNG. Next, a method of searching for the past data and a method of extracting the past data will be described.

When the user provides a search instruction, the central processing portion 17 searches for the data group that matches the search criterion from the groups of three-dimensional data SSK, two-dimensional image data SNK, position data SPK and attitude data SAK stored in the storage portion 18. As the search criterion, either one or both of the present position data SPG and attitude data SAG are specified.

In the extraction processing (search processing), either one or both of the past position data SPK and the attitude data SAG that are within a predetermined error range with respect to the specified search criterion are extracted. When plural data match the search criterion, the present data and the past data are compared, and data with less significant error therebetween is extracted with higher priority.

The three-dimensional data SSK and the two-dimensional image data SNK associated with the extracted position data SPK or attitude data SAG are extracted. The extracted three-dimensional data SSK and two-dimensional image data SNK are displayed on the display portion 19. In displaying these data, only one of them may be selectively displayed. Since the present three-dimensional data SSG or two-dimensional image data SNG is displayed in response to an operation by the user, the user can easily compare and check the past data and the present data.

By displaying the extracted past data and the present data so as to coincide with each other, the present placement position and measurement direction of the three-dimensional measuring device 1 can be made the same as the past ones. This makes the fixed point observation extremely easy.

Figure 2:
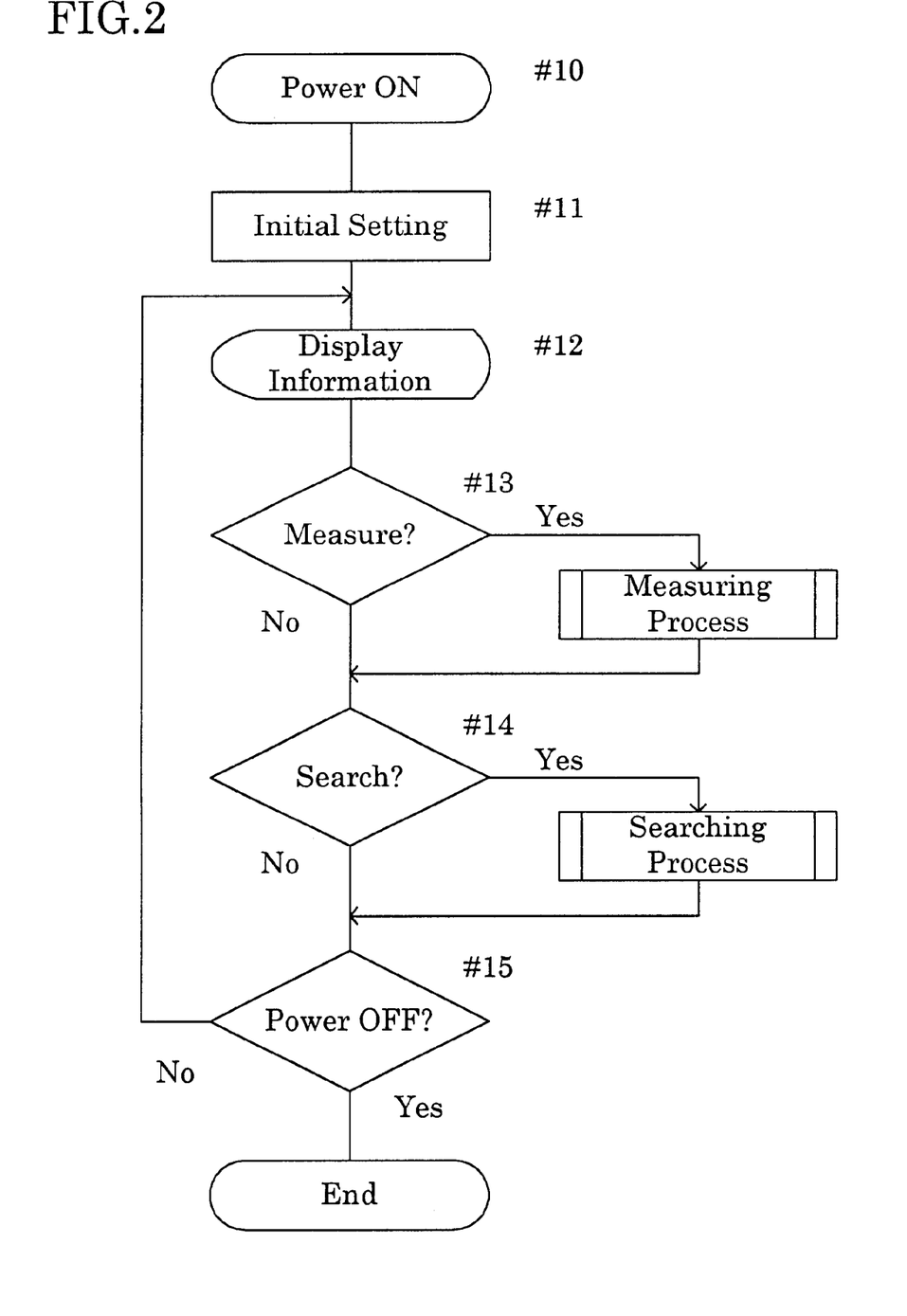
FIG. 2 is a flowchart showing the operation of the three-dimensional measuring device.
Figure 3:
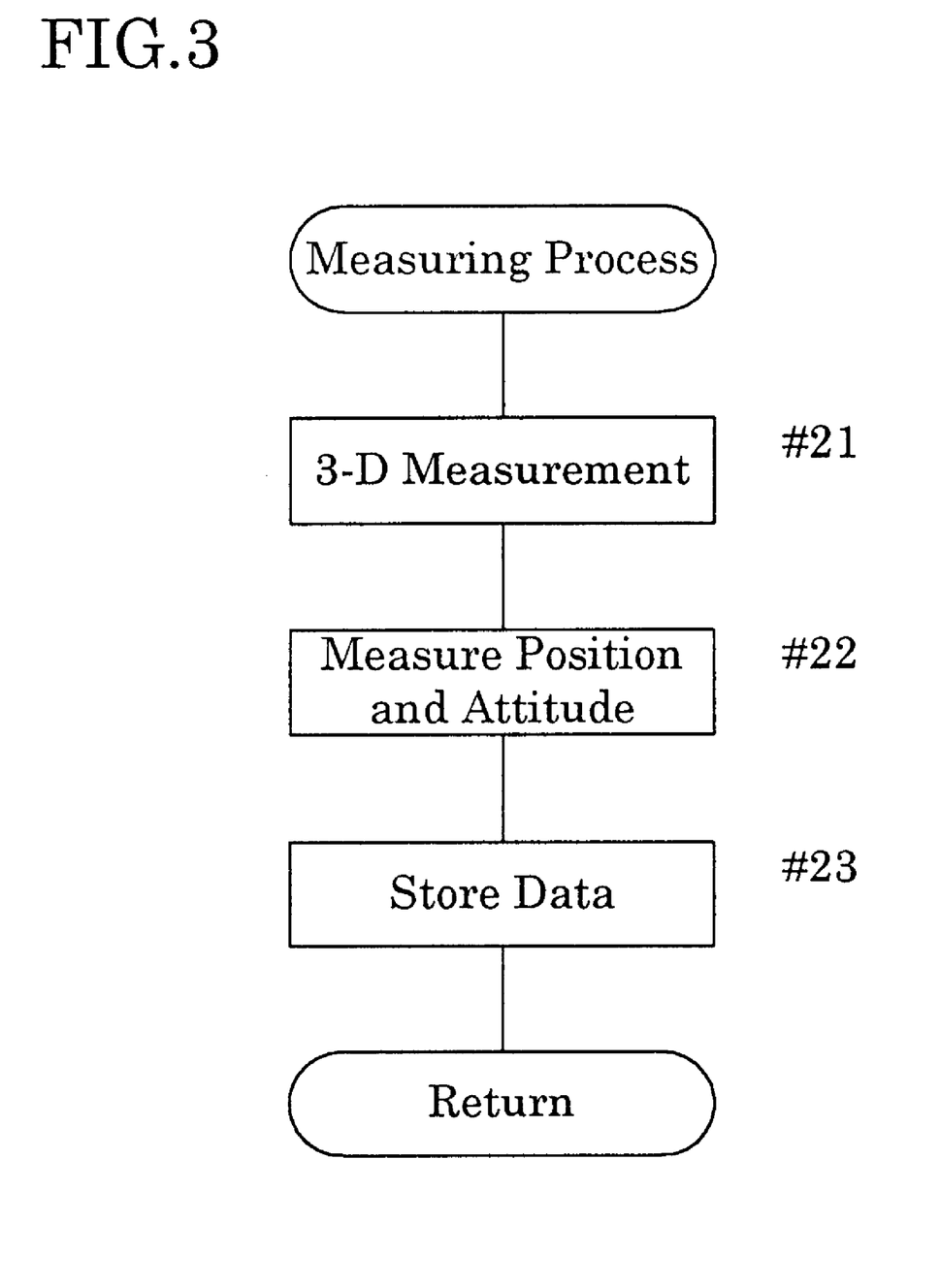
FIG. 3 is a flowchart showing an example of the measurement process.
Figure 4:
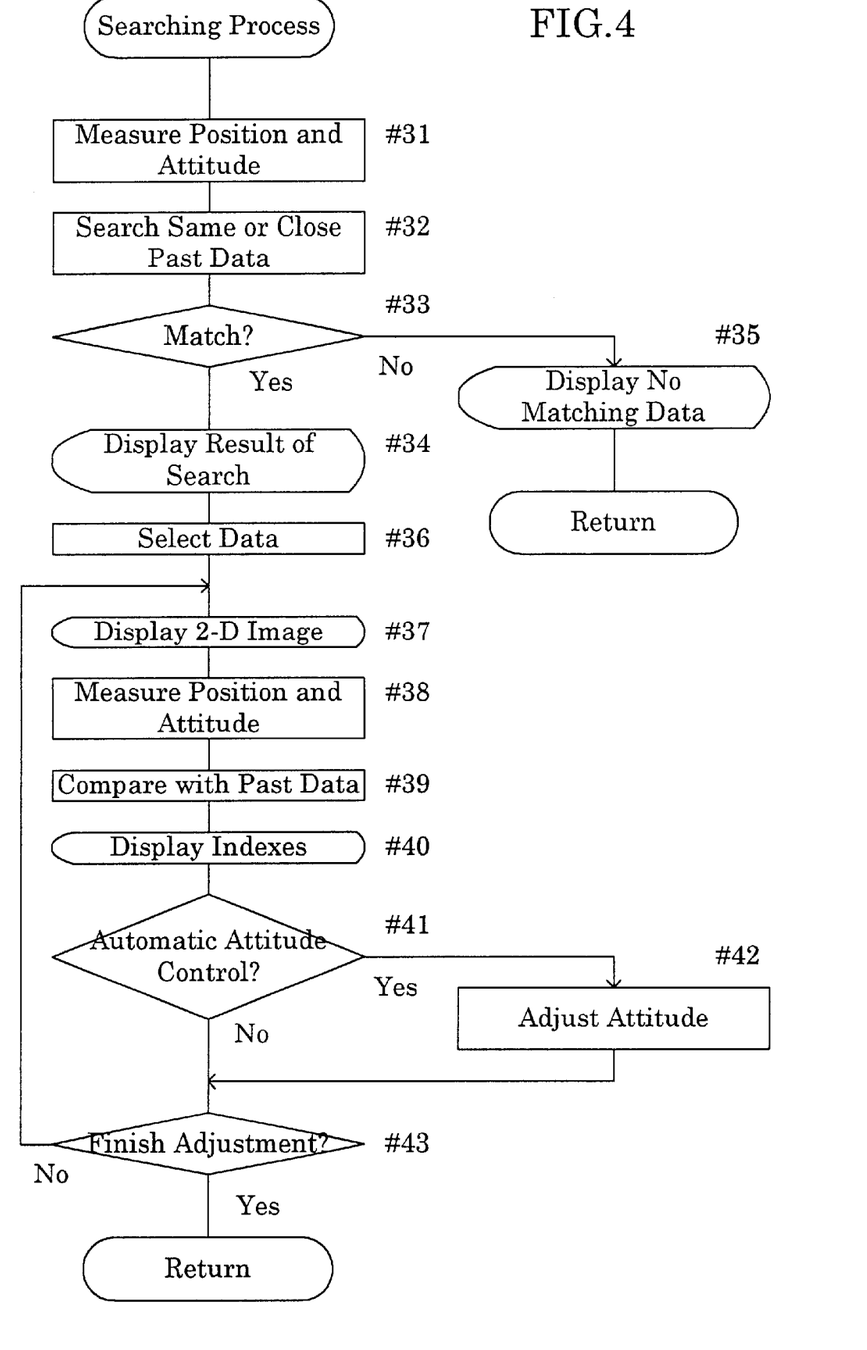
FIG. 4 is a flowchart showing an example of the search process.

FIG. 2 is a flowchart showing the operation of the three-dimensional measuring device 1. FIG. 3 is a flowchart showing an example of the measurement process. FIG. 4 is a flowchart showing an example of the search process.

In FIG. 2, when the three-dimensional measuring device 1 is powered on (#10), various initial settings are made (#11), and the two-dimensional image of the object Q situated in the present measurement range and information for guiding the user are displayed on the display portion 19 (#12). Then, the process waits until the user provides an instruction.

When a three-dimensional measurement instruction is provided by the user (Yes of #13), the process of measuring the three-dimensional data of the object Q situated in the measurement range is executed (#16). When a search instruction is provided by the user (Yes of #14), the process of performing a search on the three-dimensional data and the like calculated in the past and stored in the storage portion 18 is executed (#17).

In FIG. 3, the three-dimensional measurement portion 11 is driven to perform a three-dimensional measurement of the object Q existing in the measurement range (#21). Then, the position data and the attitude data at that time are measured by the position measurement portion 13 and the attitude measurement portion 14, respectively (#22). The obtained three-dimensional data, position data and attitude data are stored in the storage portion 18 so as to be associated with one another (#23). At this time, identification data, such as the date, the data number and comments input by the user, which enables the user to estimate or identify the contents of the three-dimensional data afterward are also recorded. The three-dimensional measurement, and the position measurement and the attitude measurement are not necessarily performed in the order shown in FIG. 3. The position measurement and the attitude measurement may be performed before the three-dimensional measurement, or they may be simultaneously performed.

In FIG. 4, first, the present position and attitude of the three-dimensional measuring device 1 are measured (#31). Then, of the past three-dimensional data stored in the storage portion 18, three-dimensional data associated with position data the same or close to the present position is searched for (#32). When there is no matching data (No of #33), it is indicated on the display portion 19 that there is no matching data (#35).

When there is matching data (Yes of #33), the position data, the attitude data and the identification data obtained through the search are displayed on the display portion 19 (#34). When plural data are obtained through the search, the obtained data are listed in order of decreasing closeness to the present position data and attitude data.

The user selects data to be compared in the current operation from among the past position data, attitude data and identification data listed on the display portion 19 (#36). When the user makes the selection, the three-dimensional measuring device 1 displays the two-dimensional image corresponding to the selected past position data, attitude data or identification data on the display portion 19 (#37). Along therewith, the present position and attitude are measured (#38), and the position data and attitude data thereof are compared with the selected past position data and attitude data (#39). Then, as shown in FIG. 5, the index GS corresponding to the present position data and attitude data and the index KS corresponding to the past position data and attitude data are displayed on the display portion 19 in a such manner that they are contrasted with each other (#40).

The user manually adjusts the placement position and the placement attitude of the three-dimensional measuring device 1 so that the present index GS coincides with the past index KS. FIG. 5 and a method of the manual adjustment will be described later.

When the user instructs the three-dimensional measuring device 1 to perform automatic attitude control (Yes of #41), the central processing portion 17 calculates the difference between the present attitude data and the past attitude data, and provides the attitude control portion 16 with an instruction so that these data coincide with each other (#42). While this is being performed, the measurement of the present placement position and placement attitude and the processing to display the indices GS and KS are repetitively performed.

When the present index GS and the past index KS coincide with each other or when the user inputs an instruction to end the adjustment (Yes of #43), the process returns to the main flow.

FIG. 5 illustrates an example of a screen HG1 showing the indices GS and KS displayed on the display portion 19.

As shown in FIG. 5, a rectangular area 191 showing the position and azimuth of the three-dimensional measuring device 1 and a circular area 192 showing the elevation angle of the three-dimensional measuring device 1 are displayed on the screen HG1.

In the rectangular area 191, the horizontal axis represents the latitude, and the vertical aids represents the longitude. An index GS1 shown by the white circle represents the present position of the three-dimensional measuring device 1, and an index GS2 shown by the arrow from the white circle indicates that the direction of the arrow represents the present azimuth angle. An index KS1 shown by the black circle represents the position of the past position data selected by the user, and an index KS2 shown by the arrow from the black circle indicates that the direction of the arrow represents the azimuth angle of the past attitude data selected by the user.

In the circular area 192, an index GS3 shown by the longitudinal line represents the present elevation angle of the three-dimensional measuring device 1, and an index KS3 shown by the broken line represents the elevation angle of the past attitude data selected by the user.

The adjustment of the placement position and the placement attitude of the three-dimensional measuring device 1 by the user is performed, for example, in the following manner: First, the position of the three-dimensional measuring device 1 is adjusted by moving the device 1 so that the index GS1 and the index KS1 coincide with each other. Then, the azimuth angle of the three-dimensional measuring device 1 is adjusted so that the direction of arrow of the index GS2 and the direction of arrow of the index KS2 coincide with each other. Then, the elevation angle of the three-dimensional measuring device 1 is adjusted so that the index GS3 and the index KS3 coincide with each other.

By making the present index GS and the past index KS on the display portion 19 coincide with each other as described above, the placement position and the placement attitude of the three-dimensional measuring device 1 can be made the same as the placement position and the placement attitude in the last measurement. Consequently, the position and the attitude are extremely easily adjusted. When an automatic attitude control instruction is provided, the adjustment is automatically made. Consequently, the workload on the user is further reduced.

Moreover, according to the above-described three-dimensional measuring device 1, the search for necessary three-dimensional data SS is easily performed. In a case where a fixed point observation is performed, data obtained in past measurements can be easily referred to. Further, even when the number of times of three-dimensional data measurement is large and a large amount of data are therefore stored in the storage portion 18, three-dimensional data obtained under the same condition are easily extracted and edited.

While in the above-described embodiment, the three-dimensional data input apparatus 1 performs the processing to calculate the three-dimensional data of the object Q in the three-dimensional measurement portion 11, the processing to calculate the three-dimensional data may be wholly or partly performed by an external apparatus such as a personal computer.

While in the above-described embodiment, the overall position and attitude of the three-dimensional measuring device 1 are measured by the position measurement portion 13 and the attitude measurement portion 14, the three-dimensional measurement portion 11 may be provided mechanically independently of the other portions so that the position and attitude of the three-dimensional measurement portion 11 are measured by the position measurement portion 13 and the attitude measurement portion 14. While the adjustment of the position and attitude of the three-dimensional measuring device 1 is made by making the index GS and the index KS displayed on the display portion 19 coincide with each other, the device 1 may be configured so that the user makes the adjustment of the position and attitude in accordance with a voice guide.

While in the embodiment described with reference to FIG. 5, the present position and attitude and the past position and attitude axe both displayed as absolute values which are the azimuth angle and the elevation angle, the relative relationship between the present position and the past position may be displayed. That is, in FIG. 5, the index GS1 is fixed at the center of the screen, the index GS2 is fixed so as to point upward and the index GS2 is fixed in the vertical direction, and the relative position and directions to them are displayed as the indices KS1, KS2 and KS3.

Moreover, the present position and attitude and the past position and attitude may be displayed in a line as mere the numeric values of the longitude, the latitude, the azimuth and the elevation angle. Moreover, the direction and the amount of the shift between the present and the past positions and attitudes may be displayed as numeric values. Moreover, displaying only the position is sufficiently effective in performing a fixed point observation. In this case, the measurement of the attitude is performed while the present and the past two-dimensional images are being compared. By doing this, the attitude measurement portion 14 can be omitted, so that the cost can be reduced.

In the above-described embodiment, the three-dimensional measuring device 1 may employ a method using ultrasonic waves instead of an optical method. The configuration, structure, circuits, processing contents and processing order of the three-dimensional measuring device 1 or of each portion of the three-dimensional measuring device 1 may be changed in accordance with the gist of the present invention.

As described above, according to the above-described configuration, data currently required by the user can be easily extracted from the stored past three-dimensional data, measurement position data or measurement direction data. When a fixed point observation is performed, the placement position and the placement attitude of the three-dimensional measuring device is easily adjusted.

Obviously, many modifications and variation of the present invention are possible in light of the above teachings. It is therefore to be understood that within the scope of the appended claims, the invention may be practiced other than as specifically described.

What is claimed is:

1. A three-dimensional data input apparatus for measuring three-dimensional data of an object to be measured, comprising:

a data input device for obtaining a measurement position data representing a measurement position at measurement;

a storage device for storing therein the measured three-dimensional data so as to be associated with the measurement position data; and extraction means for extracting past measurement position data corresponding to a present measurement position by comparing present measurement position data with a plurality of past measurement position data.

2. A three-dimensional data input apparatus as claimed in claim 1, wherein the data input device further obtains measurement direction data representing a measurement direction at measurement, wherein the storage device stores therein the measured three-dimensional data so as to be associated with the measurement position data and with the measurement direction data, and wherein the extraction means compares present measurement position data and present measurement direction data with a plurality of past measurement position data and a plurality of past measurement direction data respectively.

3. A three-dimensional data input apparatus as claimed in claim 2, wherein the extraction means extracts past measurement position data which has a difference less than a predetermined difference from present measurement position data or past measurement direction data which has a difference less than predetermined difference from present measurement direction data.

4. A three-dimensional data input apparatus as claimed in claim 2, wherein the extraction means extracts past measurement position data which has least difference from present measurement position data or past measurement direction data which has least difference from present measurement direction data.

5. A three-dimensional data input apparatus as claimed in claim 1, wherein the extraction means extracts past measurement position data which has a difference less than a predetermined difference from present measurement position data.

6. A three-dimensional data input apparatus as claimed in claim 1, wherein the extraction means extracts past measurement position data which has least difference from present measurement position data.

7. A three-dimensional data input apparatus as claimed in claim 1, wherein the data input device includes a measuring position detection device for detecting measurement position.

8. A three-dimensional data input apparatus for measuring three-dimensional data of an object to be measured, comprising:
- a measurement position data input device for obtaining a measurement position data representing a measurement position at time of measurement;
- a storage device for storing therein the measured three-dimensional data so as to be associated with the measurement position data; and
- a display device for displaying a difference between a present measurement position and a stored measurement position in a past measurement.

9. A three-dimensional data input apparatus as claimed in claim 8, wherein the display device displays the present measurement position and the stored measurement position in a past measurement on a display area.

10. A three-dimensional data input apparatus as claimed in claim 8, wherein the display device displays relative position relationship between a present measurement position and a stored measurement position in a past measurement.

11. A three-dimensional data input apparatus as claimed in claim 8, wherein the measurement position data input device includes a measuring position detection device for detecting measurement position.

12. A three-dimensional data input apparatus having measurement device for inputting three-dimensional data by measuring an object to be measured, comprising:
- a measurement position input device for obtaining a measurement position data of the measurement device at the time of a measurement;
- a measurement direction input device for obtaining a measurement direction data of the measurement device at the time of the measurement;
- a two-dimensional image input device for inputting two-dimensional image data of the object to be measured;
- storage device for storing therein the measurement position data, the measurement direction data and the two-dimensional image data so as to be associated with one another;
- extraction means for extracting from the storage device past measurement position data corresponding to present measurement position data or past measurement direction data corresponding to present measurement direction data; and
- a display device for displaying a past measurement position and a past measurement direction based on the extracted past measurement position data or past measurement direction data.

13. A three-dimensional data input apparatus as claimed in claim 12, wherein the display device displays the present measurement position overlapping with the stored measurement position in a past measurement and displays the present measurement direction overlapping with the stored measurement direction in a past measurement.

14. A three-dimensional data input apparatus as claimed in claim 12, further comprises a measurement direction controller for controlling a measurement direction of the measurement device automatically so that the present measurement direction coincide with the measurement direction in a past measurement.

15. A three-dimensional data processing apparatus for processing three-dimensional data of an object, comprising:
- a measurement position input device for obtaining a measurement position data of a measurement device at the time of a measurement;
- a storage device for storing therein measured three-dimensional data so as to be associated with the measurement position data; and
- a display device for displaying a present measurement position and the stored measurement position in a past measurement simultaneously.

* * * * *